United States Patent [19]
Ryder

[11] 3,882,220
[45] May 6, 1975

[54] METHOD OF MOLDING UTILIZING MELTABLE CORE

[75] Inventor: Francis E. Ryder, Barrington, Ill.

[73] Assignee: Ryder International Corporation, Barrington, Ill.

[22] Filed: Nov. 2, 1973

[21] Appl. No.: 412,506

Related U.S. Application Data

[63] Continuation of Ser. No. 173,786, Aug. 23, 1971.

[52] U.S. Cl. ............... 264/221; 264/242; 264/317; 264/DIG. 44
[51] Int. Cl. .............................................. B29c 1/08
[58] Field of Search ...... 264/242, 317, 221; 164/11, 164/35; 137/539

[56] References Cited
UNITED STATES PATENTS

| 720,482 | 2/1903 | Richards | 264/DIG. 44 |
| 2,628,166 | 2/1953 | Haller | 264/242 |
| 2,707,965 | 5/1955 | Allen | 137/539 |
| 3,089,232 | 5/1963 | Knight | 264/242 |
| 3,720,220 | 3/1973 | McMath | 137/539 |

Primary Examiner—Robert F. White
Assistant Examiner—T. E. Balhoff
Attorney, Agent, or Firm—Olson, Trexler, Wolters, Bushnell & Fosse, Ltd.

[57] ABSTRACT

A method of molding a hollow article with a member therein includes the steps of molding a meltable material about the member, then molding a higher melting point material about a core made up of the composite member and meltable material, and then melting out the meltable material to leave the member movable and permanently enclosed within the hollow article that is formed by the molding of the higher melting point material. The method may be used to make a variety of products, such as valve assemblies, trinkets etc.

5 Claims, 15 Drawing Figures

PATENTED MAY 6 1975
3,882,220
SHEET 1 OF 2
FIG. 1
FIG. 2
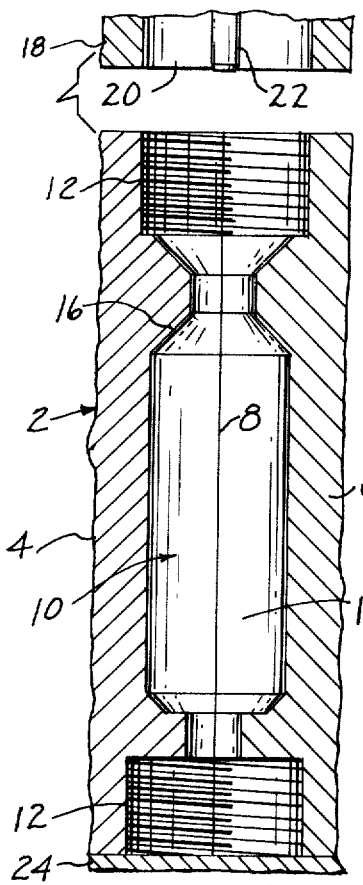
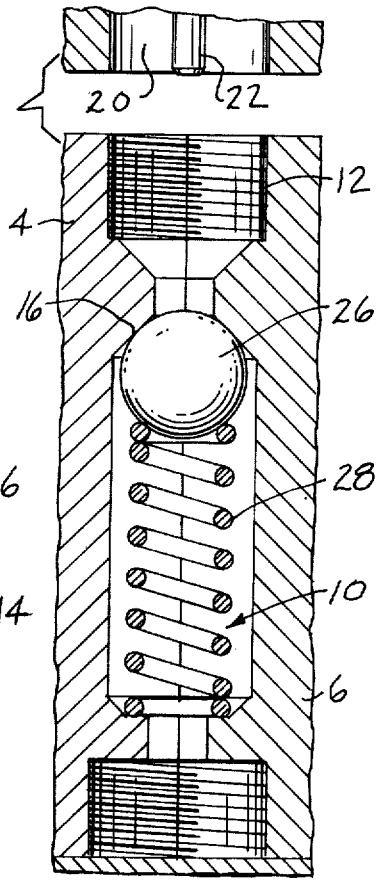
FIG. 3
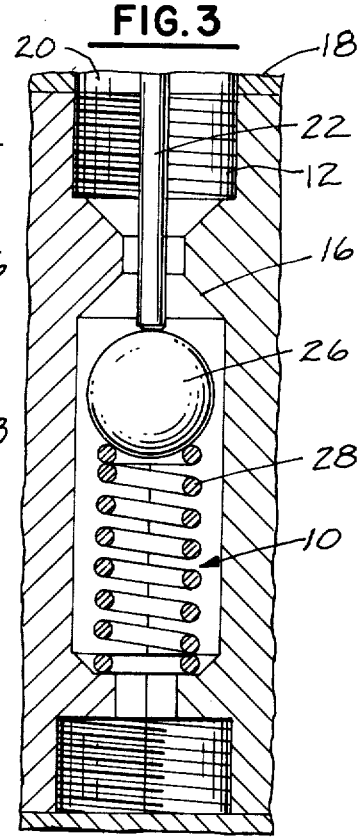
FIG. 4
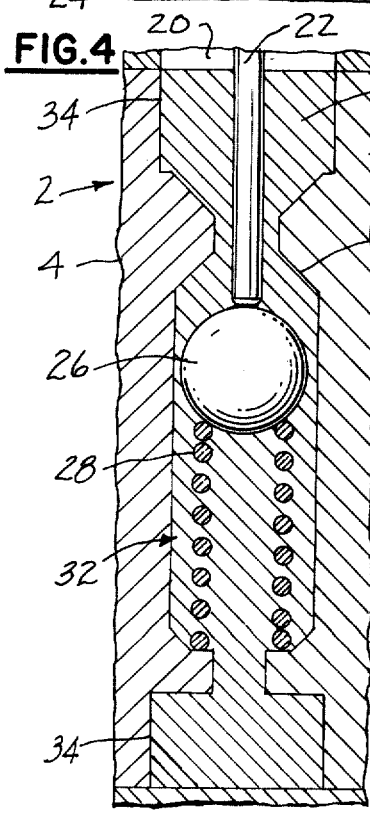
FIG. 5
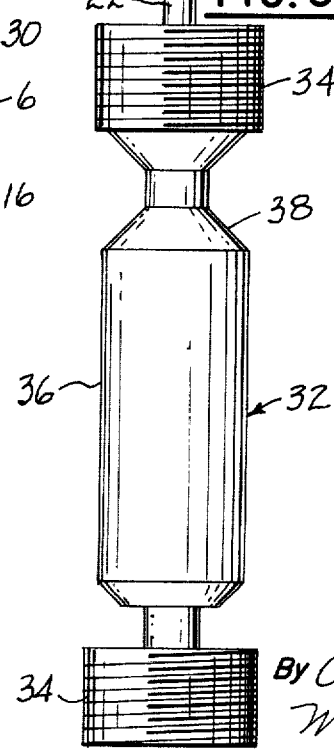
FIG. 15
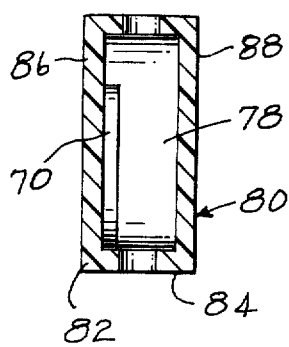
INVENTOR
FRANCIS E. RYDER
By Olson, Trexler, Wolters & Bushnell
Attys

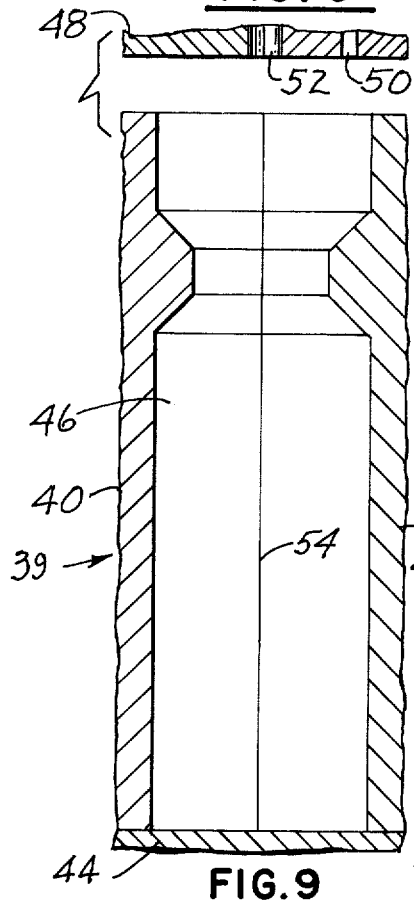
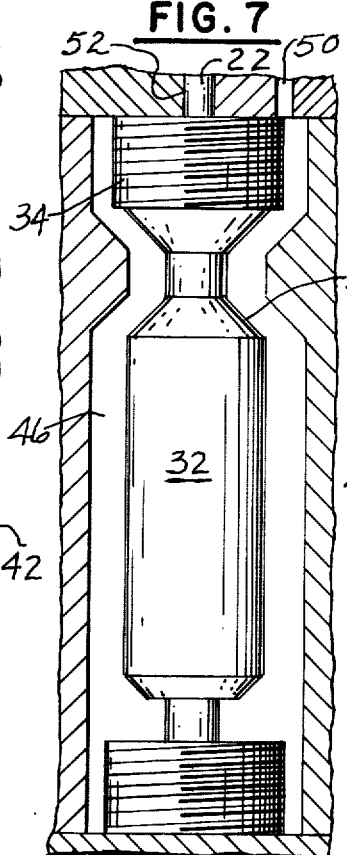
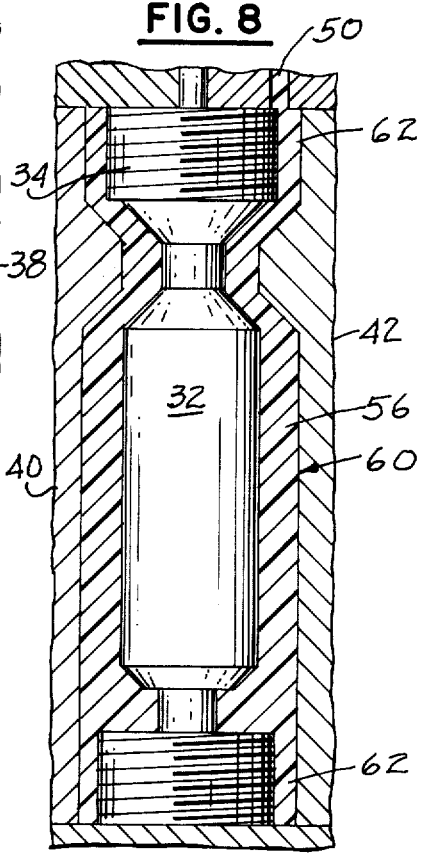
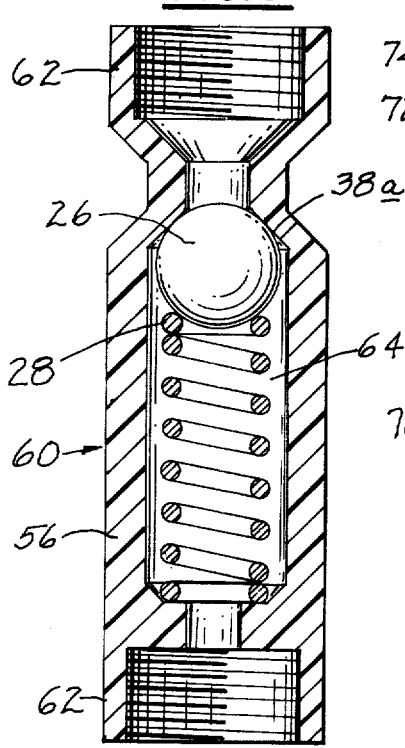
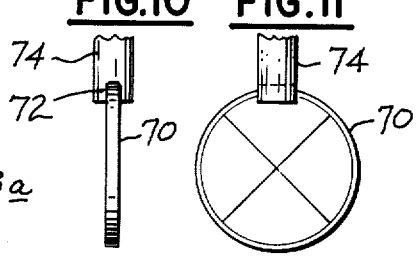
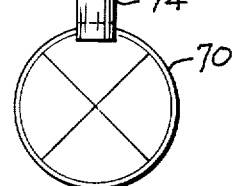
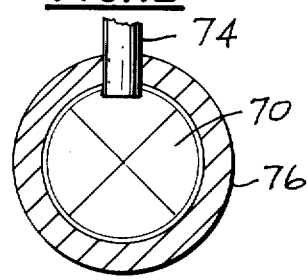
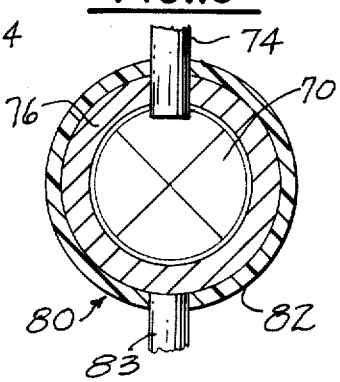
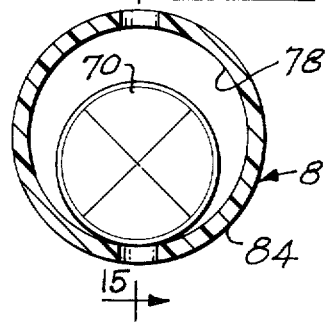

METHOD OF MOLDING UTILIZING MELTABLE CORE

BACKGROUND OF THE INVENTION

This is a continuation of application Ser. No. 173,786, filed Aug. 23, 1971.

This invention relates generally to molding processes, and more particularly to a method of molding that utilizes a meltable core.

In the fabrication of articles in which one of the parts is hollow and contains one or more other parts, it is usually necessary to fabricate the parts separately and then assemble them. If, for example, the hollow part is a molded piece and another part is non-removably disposed within the hollow or cavity of the molded piece, the hollow piece must generally be molded in two parts and subsequently bonded or fused together. This limits the choice of materials, especially if plastics are used in the molding of the hollow piece. Moreover, such procedure increases the cost of production of the item.

It is also known to mold products by the so called "lost wax" type of process. Typically in such a process the meltable core is first made to a predetermined shape after which a mold is made by molding material around the meltable core. The core is then melted out leaving a mold cavity of the shape of the core which may thereafter be used for molding a higher temperature material. Also, in some instances the mold itself may be a workpiece or other useful article that has a cavity left by the melting out of the low melting point core. In any event, the method does not provide for leaving a member movably disposed within the finished article.

OBJECTS AND SUMMARY OF THE INVENTION

It is an object of this invention to provide a method of molding an article of the type that includes a hollow article with a member disposed therein, and wherein the molding process utilizes a meltable core. The article may be a valve housing with a valve permanently enclosed therein, a trinket with a hollow body having a member therein, or various other kinds of articles.

It is a further object of this invention to provide a method of the type stated in which the article is manufactured at a lesser cost than has been heretofore possible using conventional molding and assembly techniques.

It is an additional object of this invention to provide a method of the type stated that is capable of utilizing known materials, and is particularly suitable for molding articles having an outer shell or housing of plastic.

In accordance with the foregoing objects, a first material is molded about a first core to form a second core that is a composite of the first material and the first core. Then a second material is molded about the second core. The second material has a higher melting point than the first material, and the first material is capable of absorbing sufficient heat from the molding of the second material thereabout to prevent melting of the first material. Thereafter, the first material is melted away from between the first core and second material to leave a structure in which at least a part of the first core is within a chamber formed by the molding of the second material thereabout. The first core part preferably ends up as being movable in the chamber.

In one form of the invention the second material is a plastic valve housing in which a valve member, which forms part of the first core, is disposed within the chamber of the valve housing. The valve may be a spring loaded ball check which is held against the spring to compress the latter during molding of the meltable material thereabout so that in the aforesaid second core, the spring remains compressed. When the second or housing-forming material is molded about the aforesaid second core and the meltable first material is melted out, the spring expands to seat the valve on a valve seat that is formed in the second material during the molding thereof.

In another form of the invention a disc or other member has a meltable material molded thereabout and also about the end of a pin that holds the disc. When the second or meltable material is molded about the composite and the meltable material is melted away, the pin may be withdrawn leaving the disc freely floating within the housing formed by the molding of the second material.

The housing may be of plastic while the first core (i.e. the part that remains within the housing in the finished article) is an object which, like the housing, has a melting point that is higher than that of the meltable material.

While the detailed description will cover two forms of the invention, it will be apparent that these are by way of illustration and not of limitation, as various other products can readily be molded by the process of the present invention.

BRIEF DESCRIPTION OF THE FIGURES

FIG. 1 is a longitudinal sectional view through the center line of a mold used in producing a valve in accordance with the present invention;

FIG. 2 is a sectional view similar to FIG. 1 but showing a spring-loaded ball check in the mold;

FIG. 3 is a sectional view similar to FIG. 2 and showing the ball check being depressed to preload the valve spring;

FIG. 4 is a sectional view similar to FIG. 3 following the casting and solidification of the low melting point material;

FIG. 5 is an elevational view of the casting of FIG. 4 but removed from the mold thereof;

FIG. 6 is a longitudinal sectional view through the center line of a second mold that is used in the process of the present invention;

FIG. 7 is a sectional view similar to FIG. 6, showing the mold closed, and with the casting of FIG. 5 therein as a core;

FIG. 8 is a sectional view similar to FIG. 7 after introduction of the higher melting point material into the mold but before melting away of the low melting point material;

FIG. 9 is a longitudinal sectional view of the completed structure molded in the arrangement of FIG. 8 but after melting away of the low melting point material;

FIG. 10 is a side elevational view of another form of core member used in manufacturing another type of article in accordance with this invention;

FIG. 11 is a front elevational view of the structure of FIG. 10;

FIG. 12 is a view similar to FIG. 11 but with the low melting point material molded about the structure of FIG. 11;

FIG. 13 is a sectional view similar to FIG. 12 and showing the higher melting point material molded about the lower melting point material;

FIG. 14 is a sectional view similar to FIG. 13 but with the lower melting point material having been melted away so as to form the completed article; and FIG. 15 is a sectional view taken along line 15—15 of FIG. 14.

DETAILED DESCRIPTION

Referring now in more detail to the drawing, FIG. 1 shows a mold 2 having cooperating mold parts 4, 6 which meet along a parting line 8 to define a mold cavity 10. The mold cavity 10 is of a type used when the principles of the invention are applied to molding a valve assembly. Thus, the mold cavity 10 defines opposed threaded ends 12, 12, a central bore portion 14 extending between and communicating with the threaded ends 12, 12 and a conical shoulder or seat 16. Cooperating with the mold 2 is a member 18 having an opening 20 that receives a pin 22, the latter being supported in any suitable manner. The bottom of the mold 2 is closed off by a suitable plate 24.

Referring now to FIG. 2, the mold 2 is shown as having within the bore portion 14 a ball check 26 that is biased against the seat 16 by a compression spring 28. The ball check 26 and compression spring 28 may be readily assembled within the bore portion 14 since the mold parts 4, 6 may be separated at the parting line 8 to permit this to be done. The mold parts 4, 6 are held in assembled relationship in any known manner.

After assembly of the ball check 26 and spring 28 within the bore portion 14, the member 18 is lowered onto the top of the mold 2. The pin 22 is then lowered into the mold cavity 10 through the upper threaded end 12 so as to depress the ball check 26 in opposition to the spring 28 and thereby lift the ball check 26 from its seat 16. The pin 22 may be operated for movement relative to the member 18 by any suitable mechanism. Furthermore, the pin 22 is removably attached to such mechanism for purposes presently more fully appearing. The parts of the molding assembly previously described are now in the positions shown in FIG. 3 preparatory to introducing into the mold 2 a low melting point material. The pin 22, ball check 26 and spring 28 provide a core in the cavity 10.

Referring to FIG. 4, it will be seen that low melting point material 30 may be introduced through the opening 20 and into the mold cavity 10 to fill the same completely. Upon solidification of the low melting point material 30, the ball check 26 and spring 28 are locked in position along with the pin 22. The upper end of the pin may then be removed from the mechanism to which it is attached. Thereafter, the various mold parts may be separated to remove the casting 32 from the mold. This casting 32 is used as a core piece to form a valve housing in subsequent steps of the process of the present invention. Thus, the casting 32 includes externally threaded ends 34, 34, a central section 36 that encloses the ball check 26 and spring 28, and a conical surface 38 which ultimately will be used to form the contour of the valve seat of the valve housing. Also, the pin 22 is embedded in the low melt material 30 and projects axially outwardly of one end of the casting 32, as shown in FIG. 5.

Referring now to FIG. 6, there is shown an additional mold 39 that is comprised of mold parts 40, 42 and lower closure plate 44 which define a mold cavity 46 that is larger than the mold cavity 16 of the mold 2. In addition, the mold 39 includes a closure 48 that is opposite to the closure plate 44, the closure 48 including a sprue or gate 50 and a central hole 52 with just sufficient clearance for receiving the pin 22. The mold parts 4, 6 may be separated along a parting line 54 to facilitate insertion of the casting 32 therein (FIG. 7).

Referring now to FIG. 7, it will be seen that the casting 32 is placed within the mold cavity 46 such that the pin 22 fits within the hole 52 whereby the casting 32 serves as a core in the cavity 46 of the mold 39. The slidable interfit of the pin 22 with the hole 52 serves to center the core-forming casting 32 properly within the mold cavity 46. The lower end of the casting 32 may rest on the plate 44.

Plastic or other suitable material 56 is then injected into the mold cavity 46 through the sprue 50 to fill the mold cavity 46 completely except for the portion thereof that is occupied by the core-forming casting 32. Thus, the plastic 56 forms a hollow member or housing 60 (FIG. 9) which is disposed about the core-forming casting 32. However, upon removal of the cast assembly of FIG. 8 from the mold 39, the core-forming casting 32 is melted away to leave the structure shown in FIG. 9. This may be done by heating the casting of FIG. 8 in any suitable manner so that the low melt material flows out of an open end of the housing 60. It will be noted that the housing 60 has internally threaded ends 62, 62 and a central chamber 64 that contains the ball check 26 and the spring 28. Melting out of the low melt material allows the pin 22 to be withdrawn and results in the spring pressure causing the ball check 28 to seat against the valve seat 38a, which is of companion shape to the surface 38 of FIG. 5.

In connection with the present invention it should be noted that while the melting point of the material 56 is substantially higher than the melting point of the material 30, the material 30 is of such characteristic and has sufficient mass so that it acts as a heat sink and so absorbs heat from the material 56 during the molding step shown in FIG. 8 without causing the low melting point material 30 to melt. Furthermore, the mold 38 may be water cooled to chill the material 56 quite rapidly so that there are no problems of surface melting or deterioration of the low melting point material 30.

Various known materials may be used for the low melting point material 30 and the higher melting point material 56. For example, the low melt material may be a metallic alloy of 58% bismuth and 42% tin. Such an alloy melts at about 281°F. For the higher melting point material, various known plastics which melt at about 350° - 360°F may be used. By way of example an acetal resin having a melting point of about 350°F may be used. It is also possible to use resins having a melting point of the order of 300°F higher than that of the low melting point material. For example, polycarbonate resins having a melting point of about 580°F may be used when the low melt material is the aforesaid bismuth-tin alloy.

In FIGS. 10 and 11 a circular disc 70 of high melting point metal or plastic is frictionally gripped at a localized area of its periphery by engagement in an end slot 72 of a pin 74. Initially, and as shown in FIG. 12, a low melting point material 76, for example of the type previously described, is molded about the disc 70 and a portion of the end of the pin 74. The thickness of the low melt material 76 is greater than the thickness of the disc 70 so that the disc 70 is completely encapsulated by the low melt material 76. Such thickness may be the same as the thickness of the cavity 78 (FIGS. 14 and 15) of the hollow member 80 in which the disc 70 will ultimately be movably disposed. Conventional molds for molding the material 76 about the disc 70 are known and are, therefore, not shown or described.

The casting of FIG. 12 is used as a core piece for molding the high melting point plastic or other material 82 about the core piece as shown in FIG. 13. If desired, an additional pin 83 opposite to the pin 74 may also be used in the molding process of FIG. 13. Furthermore, in the present example, the cavity of the mold that is used is of a configuration that molds the member 80 into a hollow cylindrical piece having a cylindrical wall 84 and parallel end walls 86, 88 as shown.

After the high melt material is molded as shown in FIG. 13, one or both of the pins 74, 83 are retracted. Thereafter the casting is heated to melt out the low melt material 76 through one or more of the holes left by the pins 74, 83. This leaves the structure shown in FIG. 15 in which the disc 70 is loosely disposed within the chamber 78.

The invention claimed is as follows:

1. A method of molding an article including a housing and a spring biased element held captive within said housing, said method comprising the steps of: providing a first mold having a cavity shaped to the desired inner configuration of the housing; positioning a biasing member and an element within said first mold cavity; depressing said element against said biasing member to disengage said element from any restrictions in said first mold cavity; molding a first material about said element and biasing member while maintaining said element depressed to provide a casting including said element and said biasing member in the depressed condition; molding a second material about the casting, said second material having a higher melting point than said first material; and melting said first material away from between said second material and said element and biasing member, while maintaining said second material solidified, thereby freeing said element to be biased into engagement with a seating surface provided by said second molded material.

2. A method as defined in claim 1, wherein said step of molding a second material about the casting includes the steps of: providing a second mold having a second cavity corresponding in shape to the desired outer configuration of the housing; positioning said casting in said second mold cavity to function as a core element thereof, and introducing said second molding material into said cavity about said casting.

3. A method according to claim 1 further including steps of: selecting said first material such that it has characteristics and mass as to constitute it a heat sink to prevent melting thereof during molding of said second material, whereby molding of said second material about said first casting produces a second, component casting comprised of said first and second materials, said element and said biasing member; and subjecting said second, component casting to a temperature that is less than the melting point of said second material, said element and said biasing member, but greater than the melting point of said first material so that said first material is liquefied while said second material, said element and said biasing member remains solidified; and removing said liquefied first material from the interior of said second solidified material thereby freeing said element and said spring member.

4. A method according to claim 1, wherein said article is a valve assembly, and said element is a valve member designed to seat in sealing engagement against a seating surface provided on said housing.

5. A method as defined in claim 1, wherein said step of depressing said element against the action of said biasing member includes the step of: introducing a pin element into said first mold cavity to engage said element and depress said element axially away from any restricting surface on said first cavity, against the force of said biasing member; and said step of molding a first material includes the step of maintaining said pin in position and molding said first material about said pin element.

* * * * *